A. J. GIBBS.
PUSH RAKE ATTACHMENT.
APPLICATION FILED APR. 24, 1917.
1,276,519.
Patented Aug. 20, 1918.
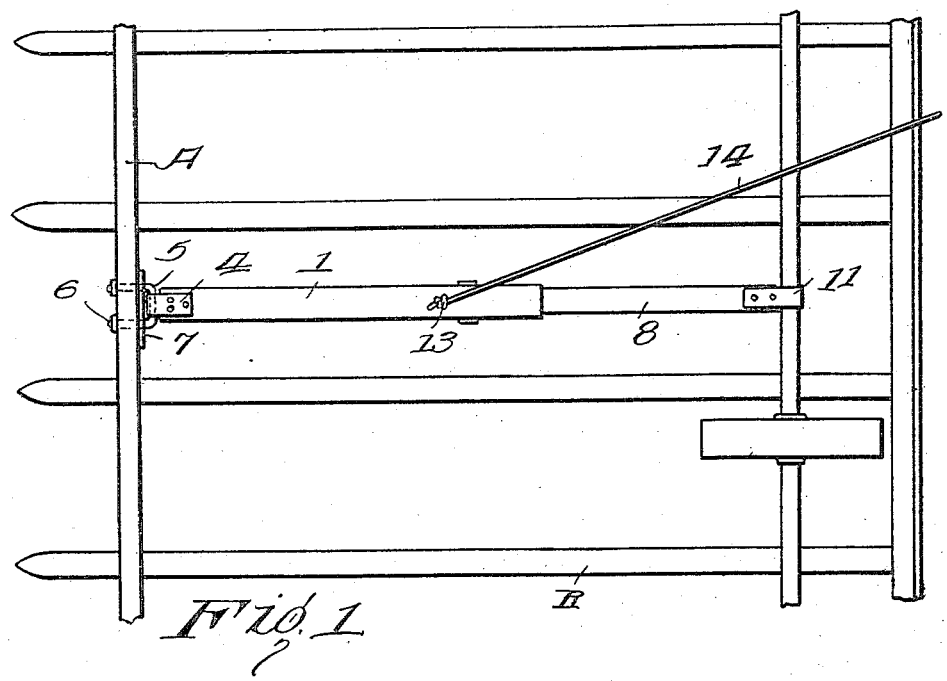
Fig. 1.
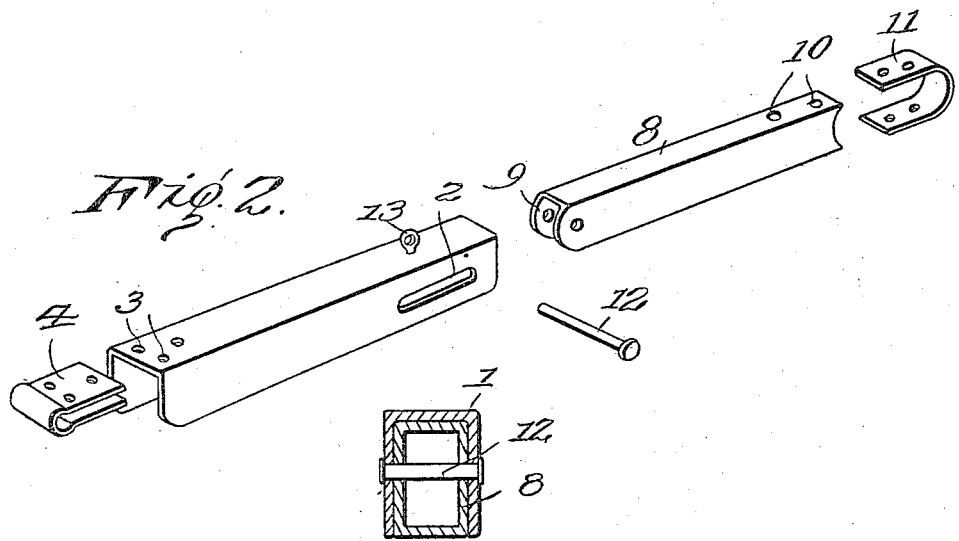
Fig. 2.
Fig. 3.
Alfred J. Gibbs
Inventor
By Geo. P. Kimmel
Attorney

UNITED STATES PATENT OFFICE.

ALFRED J. GIBBS, OF HAY SPRINGS, NEBRASKA.

PUSH-RAKE ATTACHMENT.

1,276,519.  Specification of Letters Patent.  Patented Aug. 20, 1918.

Application filed April 24, 1917. Serial No. 164,266.

*To all whom it may concern:*

Be it known that I, ALFRED J. GIBBS, a citizen of the United States, and resident of Hay Springs, in the county of Sheridan and State of Nebraska, have invented certain new and useful Improvements in Push-Rake Attachments, of which the following is a specification.

My invention relates to improvements in push rakes such as disclosed in my pending application bearing Serial Number 154,329 and it is the dominant object of the invention to provide a novel locking means for maintaining the abutment or "push-off" in distended position in order that the same can be used as a means for loading hay onto a stacking device or the like.

It is a more specific object of the invention to provide a locking arm of the character mentioned so constructed as to allow the folding thereof into compact form when not in use, thus, allowing the rake to perform its principal functions.

Other and further improvements and novel details in the construction and arrangement of parts will be appreciated from the description to follow, which for a clear understanding of the invention should be considered in connection with the accompanying drawings forming a part hereof and wherein the preferred embodiment of the invention is shown for the purpose of illustration.

In the drawings:

Figure 1 is a top plan of the improved push rake with my locking attachment applied thereto;

Fig. 2 is a disassembled perspective of the improved locking attachment; and

Fig. 3 is a transverse section therethrough.

Similar characters of reference are employed in all of the above described views to indicate corresponding parts.

Referring now more specifically to the several figures of the said drawings there is shown a push rake designated in its entirety by the reference letter R having an abutment A slidably mounted upon the various teeth thereof whereby the same may be moved from a position adjacent the head of the said push rake to a position in proximity of the forward extremities of the rake teeth when it is desired to use the rake as a means for pushing or forcing hay onto a stacking device or the like.

With more particular reference to the present improvements, the improved locking arm includes a receiving arm 1 substantially U-shaped in cross section, the rear extremity of which is provided with horizontally alined slots 2 while the forward extremity thereof is formed with a plurality of openings 3 with which complementally disposed openings formed in a hinge element 4 are adapted to be alined to permit the passing of fastening devices such as rivets therethrough. Upon the slidable abutment A preferably, intermediate its respective ends, there is arranged a U-bolt 5 the lateral extremities of which are passed through the said abutment and are locked in position thereon by turning nuts 6 into engagement with the screw threaded extremities thereof. A bearing plate 7 having a plurality of openings formed therein to receive the said lateral extremities of the U-bolt 5 is arranged upon the opposite base of the abutment A, and as will be understood, serves as a bearing for the hinge element 4.

A second arm 8, preferably constructed of squared tubing is also employed and has formed upon one end thereof apertured bearing ears 9, while within the remaining end thereof vertically disposed openings 10 are formed to permit the securing of a U-shaped clip 11 thereto, the extremity of the clip passing about the axle of the push rake construction. The arm 8 is of a size and shape such as will permit snug reception thereof within the trough like receiving arm 1 while the apertured bearing ears 9 are alined with the elongated slots 2 of the said receiving arm and a rivet 12 then passed therethrough, and having its free end upset.

An eye 13 is secured to the upper side of the receiving arm 1 at a point in proximity of the slotted portion 2 thereof and is engaged by a rope 14 or like connection to permit the raising of the pivotally connected end of the said arms 1 and 8 when it is desired to move the abutment A to its inoperative position adjacent the head of the rake R.

With my improved locking arm, the abutment of the push rake can be moved to a position adjacent the rake head when not in use and by so doing will allow the rake to perform its principal function without interference therefrom. Further, the abutment A when in its inoperative position will serve as a secondary head for the rake construction. When in operative or distended position the abutment A will be rendered immovable, irrespective of the stress applied thereto, since, it is evident that the pivotally connected sections 1 and 8 of the locking arm, when longitudinally alined, will serve as efficient bracing means therefor.

Manifestly, the construction shown is capable of considerable modification and such modification as is within the scope of my claim, I consider within the spirit of my invention.

I claim:

In combination with the slidable abutment of a push rake, a channel member hinged at one end to said abutment and having oppositely disposed slots in the remaining end thereof, a second member of less size than the channeled member capable of nesting therein having spaced apertured ears on one end and its remaining end pivoted to a portion of the rake, means for pivotally connecting the adjacent ends of said members and permitting relative sliding movement therebetween, and other means connected to said channeled member at a point slightly beyond the pivotal connection thereof for facilitating upward movement of the same.

In testimony whereof, I affix my signature hereto.

ALFRED J. GIBBS.

Copies of this patent may be obtained for five cents each, by addressing the "Commissioner of Patents, Washington, D. C."